June 13, 1939.  C. BEAUCOLIN  2,161,793
REFLECTOR-HEATER WITH SHEATHED ELECTRIC HEATING ELEMENTS
Filed June 24, 1937
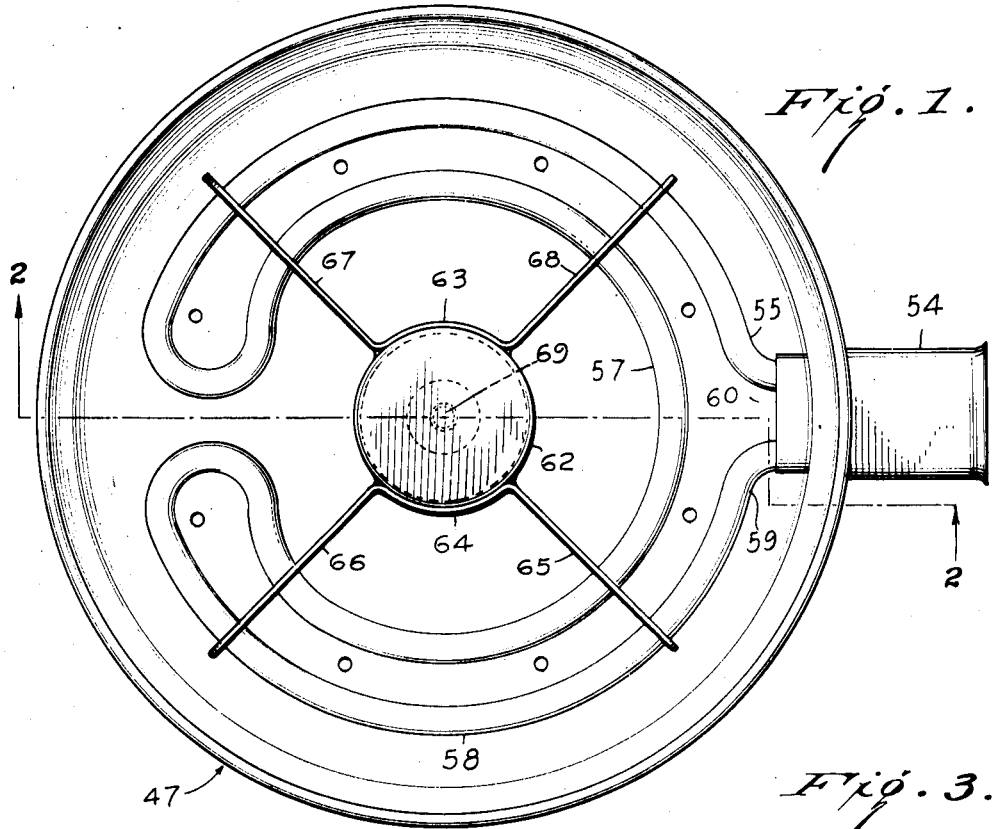
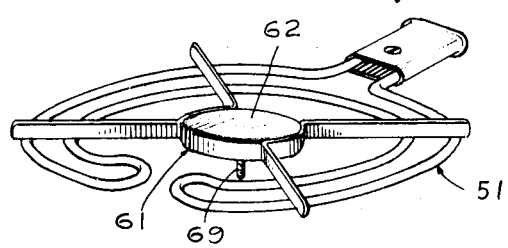
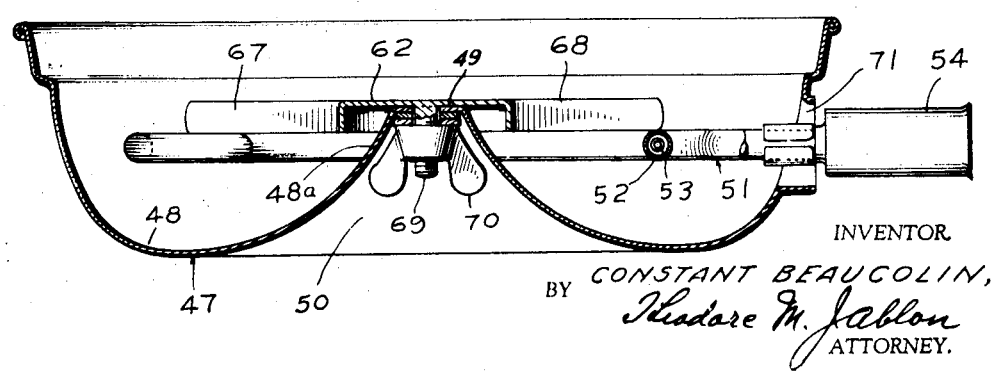
INVENTOR.
CONSTANT BEAUCOLIN,
BY Theodore M. Jablon
ATTORNEY.

Patented June 13, 1939

2,161,793

UNITED STATES PATENT OFFICE 2,161,793

REFLECTOR-HEATER WITH SHEATHED ELECTRIC HEATING ELEMENTS

Constant Beaucolin, Luxemburg, Luxemburg

Application June 24, 1937, Serial No. 150,209

3 Claims. (Cl. 219—34)

My invention relates to and has for its purpose the provision of heating devices particularly adapted although not necessarily for the use in households and embodying a ring-shaped sheathed heating element capable of transmitting and reflecting heating rays.

It is a further purpose of my invention to provide a heating device having a minimum number of parts and characterized by constructional simplicity, durability and inexpensiveness of manufacture.

In the use of heating vessels, pots, casseroles for electric heating, and particularly of testing tubes, reaction glasses and similar vessels for chemical reactions, it is desirable that the vessel containing the goods to be heated should be independent of any exterior connection with the electric mains.

The former modes of heating on heated metallic surfaces by contact are objectionable in that they require carefully made vessels with suitable even bottoms of metallic material.

In order to overcome these and other objections, it is an object of my invention to provide improved means whereby all vessels and pots, tubes and all kinds of heating utensils may be electrically heated and maintained at a proper temperature, independent of shape and material.

It is a further object of my invention to provide a portable heater that is so constructed that it may be easily managed by any person by arrangements which render it possible to mount and dismount the heating body by a single manipulation.

The following brief reference to the behavior of suitable arranged heating bodies and the transmitted heat rays will serve to show how the above objects are attained and to bring out the salient feature of the invention.

The main advantage of this invention consists in this that by appropriate shape and arrangement of the source of heat, of its opposition towards surrounding reflecting surfaces and the heated vessel and particularly of its dimensions, the possibility is afforded of heating over a relatively large surface thereby reducing substantially the amount of heat falling on the unit surface.

It is of particular advantage to employ curved reflecting surfaces like ellipsoids or paraboloids which allow of introducing the electric heating element in the form of rings or combined rings and other curves in such a position in relation to the reflecting surfaces that the reflected rays can be concentrated or distributed at determined points inside or outside the reflector vessel. By investigation and numerous tests it has been proved that the best effect of heating is attained if the plane of the heating element is identical with the plane of foci of the surrounding reflector, and the minimum radial distance of the focus from the reflector surface is greater than the twofold and smaller than the fivefold diameter of the heating tube. In the case of ellipsoids as reflectors the distance between the foci of the generating ellipse is advisably greater than the simple and smaller than the fivefold minimum distance of the focus from the reflector surface.

Another object of this invention is the providing of the heating tube with a loosely mounted or welded fixing cross and a central screw, enabling mounting and dismounting from the reflector body by a single manipulation of screwing off and to the latter, whereas the terminal portions of the heating tube are provided with a protecting cap or terminal socket forming a single piece with the heating tube. The heating body, described as above, may be combined with reflector bodies of any regular shape, which may have a reduced self-capacity by a coat of gold, chromium, nickel or other metals, or may be of any ceramic material.

In all instances the reflector body forms with its space around the heating element a heat-insulating space and the stored energy is of economical advantage. To shorten the necessary period of heating, the heating element described above, and made of sheathed insulated resistances, may be shaped in such a way, that besides its focular ring additional parts of other shapes serve as contact-heating surface.

Although I have herein shown and described only one form of this invention, it is to be understood that various changes and modifications may be made therein without departing from the spirit of it and the scope of the appended claims:

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawing in which:

Fig. 1 is a plan view of an embodiment of a heater construction with metal sheathed or metal tube enclosed annular focally effective heating element and mountings therefor.

Fig. 2 is a longitudinal section taken upon the line 2—2 in Fig. 1.

Fig. 3 is a perspective detail view of the heater element.

Figs. 1 to 3 represent a construction embodying specific features of structure and shape of the reflector shell body and features which lie in the construction and mounting of a heat emmitting element having heat reflecting relationship with the reflector.

The construction comprises a reflector shell body 47 theoretically defined by an annular focus and an annular surface of eliptic or other reflector characteristics. As a structure the reflector shell comprises an annularly dished reflector portion 48 and intergeral therewith a central mound or saddle 48a forming a part of the effective heat reflecting surface and formed with a flat top portion and constituting a hollow 50. This mound or saddle portion of the shell is shaped and adapted for the mounting thereon of a heat emitting element 51 precently to be described, while the surrounding or annularly effective or marginal portion of the shell offers the desired reflector surface.

The heating element 51 of this embodiment comprises a tubular casing or metal sheathing 52, within which extends the electrical resistance body 53 proper. The ends of the heating element terminate in a socket 54 adapted for connection with a standard cable plug, such as of the house network. More specifically, the heat effective portion of the heat emitting element as shown in this embodiment extends somewhat in a form of a double loop; that is to say, starting at 55 from the socket 54 to form an outer semi-circular portion 56, then doubling up upon itself by way of an inner circular portion 57 which in turn continues into second outer semi-circular portion 58, to terminate at 59 in the socket 54. The starting and the terminating portions 55 and 59 respectively are shown to be held together by a clamp 60.

The mounting of the heat emitting element comprises a spider-like construction 61 having arms traversing the heating element upon which they are fastened in some suitable manner, for instance, by way of brazing. This spider mounting comprises a central hub or cap portion 62 upon which are fastened metal strips 63 and 64 in the manner shown and constituting the 4 spider arms 65, 66, 67, 68. The hub portion 62 of this mounting has rigidly extending from its underside a bolt 69 over which fits a wing nut 70. Bolt and nut serving to fasten the heat emitting element upon the mound or saddle 48a, the hub portion 62 to rest upon the flat top of the mound, with the wing nut 70 snugly although accessibly lodged within the hollow 50 of the mound. The terminals of the heat emitting element and the socket 51 therefor are shown to extend clear through an opening 71 provided in the side of the reflector shell.

The operation of a reflector heating device more particularly shown in Figs. 1 and 2, is substantially self-evident from the foregoing and from the drawings, and a unique and simple way of mounting and of manipulating the heating element is also believed to be clear from Figs. 1 and 2, although reference is made to Fig. 3, showing the heat emitting element detached. Consequently, it is clear that the heating element can be quickly removed by loosening the wing nut 70, whereupon access may be gained to the reflecting surface of the shell should it seem to need cleaning or polishing.

It will be seen that this device has a sheathed heating element 51 fixed to the spider-like construction 61 which in turn is directly and detachably fastened to the mound-like portion 48a of the reflector body so that the heating element is supported in effect solely upon and by the mound-like portion of the reflector body, and so that in effect and substantially this heating device constitutes a two-piece mounted assembly as of reflector body and heating element.

It will further be understood that in the operation of this device reflected heat, more specifically heat projected into a theoretical conjugate focus may serve to heat, cook or boil whatever foodstuffs are placed upon the heater and it should further be understood that by the very reason of its reflector body, this heater can also be used advantageously in an upside down position; that is to say, when placed in a cover-like manner over a dish, so that its heat is projected downwardly on to the food which it is desired to heat, cook or boil.

I claim:

1. An electric heating device comprising a reflector body defined by a substantially annular trough-like reflector surface having an annular line of foci and having a central mound-like portion integral therewith and forming a part of the effective heat reflecting surface; an annularly extending sheathed heating element positioned substantially in the plane of said line of foci; a spider-like structure having radial arm portions fixed to said annular sheathed heating element and adapted to be seated upon said mound-like portion, and means for directly and detachably fastening said spider-like construction to said mound-like portion so as to support the spider-like structure in effect solely upon and by said mound-like portion of the reflector body, said heating device thus constituting in effect and substantially a two-piece mounted assembly as of reflector body and heating element.

2. An electric heating device according to claim 1, in which the fastening means comprise a bolt and nut connection anchored in and held by said mound-like reflector portion.

3. An electric heating device according to claim 1, in which the fastening means comprise a bolt and nut connection, said bolt being rigid with said spider-like construction and said nut being anchored in the hollow of said mound-like central reflector portion.

CONSTANT BEAUCOLIN.